(12) United States Patent
Wang et al.

(10) Patent No.: US 9,279,663 B2
(45) Date of Patent: Mar. 8, 2016

(54) METHOD AND APPARATUS TO FOLD OPTICS IN TOOLS FOR MEASURING SHAPE AND/OR THICKNESS OF A LARGE AND THIN SUBSTRATE

(75) Inventors: Chunhai Wang, Pleasanton, CA (US); Chunsheng Huang, San Jose, CA (US); Andrew An Zeng, Fremont, CA (US); Frederick Arnold Goodman, Oakland, CA (US); Shouhong Tang, Santa Clara, CA (US); Yi Zhang, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 110 days.

(21) Appl. No.: 13/561,377

(22) Filed: Jul. 30, 2012

(65) Prior Publication Data

US 2014/0029016 A1 Jan. 30, 2014

(51) Int. Cl.
*G01B 9/02* (2006.01)
*G01B 11/06* (2006.01)
*G01B 11/24* (2006.01)

(52) U.S. Cl.
CPC .............. *G01B 11/06* (2013.01); *G01B 9/0203* (2013.01); *G01B 9/02021* (2013.01); *G01B 11/2441* (2013.01); *G01B 2290/70* (2013.01)

(58) Field of Classification Search
CPC ............. G01B 9/02; G01N 21/00; G02B 5/04
USPC ....................... 356/237.5, 450, 512
See application file for complete search history.

(56) References Cited

U.S. PATENT DOCUMENTS

| | | | |
|---|---|---|---|
| 5,130,855 A * | 7/1992 | Mukai et al. ................. 359/836 |
| 5,995,226 A | 11/1999 | Abe et al. |
| 6,504,615 B1 | 1/2003 | Abe et al. |
| 6,847,458 B2 | 1/2005 | Freischlad et al. |
| 7,012,680 B2 | 3/2006 | Kubo et al. |
| 7,847,954 B2 | 12/2010 | Tang et al. |
| 8,068,234 B2 | 11/2011 | Tang et al. |
| 2004/0184038 A1* | 9/2004 | Freischlad et al. ............ 356/512 |
| 2011/0043798 A1* | 2/2011 | Markwort et al. ......... 356/237.5 |

FOREIGN PATENT DOCUMENTS

| | | | |
|---|---|---|---|
| KR | 10-1997-0057665 A | | 7/1997 |
| KR | 10-2005-0070250 A | | 7/2005 |
| KR | 1020050070250 A | * | 7/2005 |
| KR | 10-2006-0009674 A | | 2/2006 |
| KR | 10-2011-0087069 A | | 8/2011 |

* cited by examiner

*Primary Examiner* — Tarifur Chowdhury
*Assistant Examiner* — Jamil Ahmed
(74) *Attorney, Agent, or Firm* — Suiter Swantz pc llo

(57) ABSTRACT

A semiconductor measuring tool has a folding mirror configuration that directs a light beam to pass the same space multiple times to reduce the size and footprint. Furthermore, the folding mirrors may reflect the light beam at less than forty-five degrees; thereby allowing for smaller folding mirrors as compared to the prior art.

20 Claims, 3 Drawing Sheets

METHOD AND APPARATUS TO FOLD OPTICS IN TOOLS FOR MEASURING SHAPE AND/OR THICKNESS OF A LARGE AND THIN SUBSTRATE

FIELD OF THE INVENTION

The present invention is directed generally toward semiconductor wafer processing and more particularly toward measuring the shape and thickness of semiconductor wafers.

BACKGROUND OF THE INVENTION

In a typical tool for measuring the shape and thickness of a silicon wafer, two channels of interferometers are employed to measure both surfaces of the wafer. Each interferometer usually comprises lenses that image the wafer to a video camera. This way the whole wafer can be measured by the camera with millions of pixels, eliminating the need to mechanically scan the wafer, and the throughput is dramatically improved compared to scanning systems.

One disadvantage of this method is that the size of the measuring tool is large due to the size of imaging optics. As the semiconductor industry shifts to larger wafers (for example from 300 mm to 450 mm) the size of the measuring tool may increase significantly. Simply scaling up existing measuring tools designed for a 300 mm wafer to accommodate a 450 mm wafer would result in a measuring tool much more expensive and fifty percent larger in every direction. At that size, the measuring tool may not physically fit in a space currently designated for such measuring tools.

Consequently, it would be advantageous if an apparatus existed that is suitable for measuring the shape and thickness of a silicon wafer with a compact optical arrangement.

SUMMARY OF THE INVENTION

Accordingly, the present invention is directed to a novel method and apparatus for measuring the shape and thickness of a silicon wafer with a compact optical arrangement.

In one embodiment of the present invention, a measuring device includes mirrors for directing the optical path along an axis parallel to an axis normal to the surface of the wafer. Such configuration allows utilization of the space along the length of the measuring tool.

In another embodiment of the present invention, a method for measuring semiconductor wafers includes reflecting an interferometric image from a first axis normal to a surface of the semiconductor wafer to a second axis parallel to the first axis where the interferometric image is captured by a camera. By this method, the optical path from the wafer to the image is extended concurrently with the length of the measuring tool. Increased length allows for larger optical components and therefore imaging larger semiconductor wafers.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
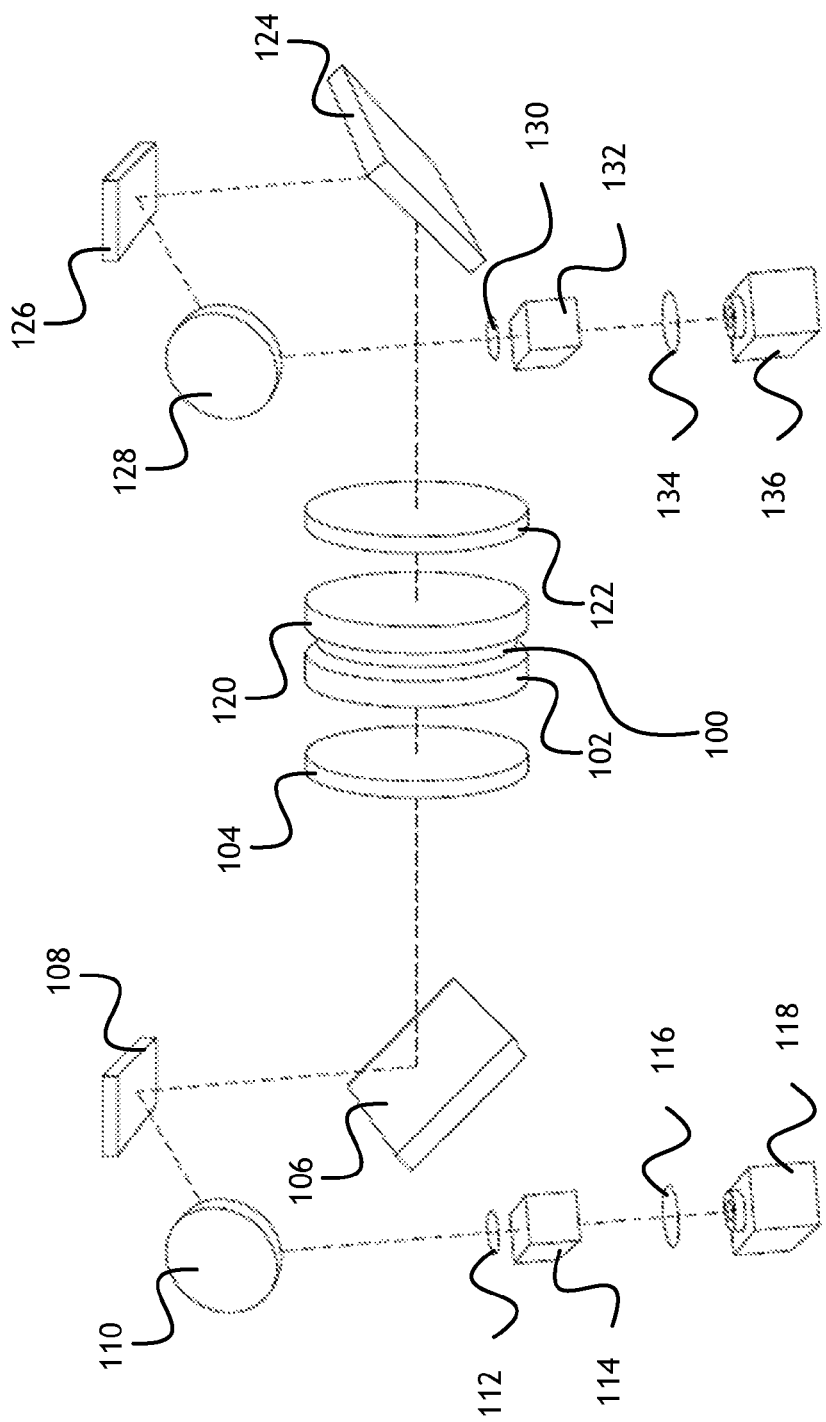
FIG. 1 shows a perspective view of a measuring tool.

Referring to FIG. 1, a perspective view of a measuring tool is shown. The measuring tool may include one or two reference flats 102, 120. Reference flats 102, 120 are the references for measuring surface flatness of a semiconductor wafer 100. The measuring tool may also include one or two collimators 104, 122. Collimators 104, 122 narrow or collimate light from a semiconductor wafer 100. The measuring tool may also include one or more series of folding mirrors 106, 108, 110, 124, 126, 128.

Each series of folding mirrors 106, 108, 110, 124, 126, 128 may reflect an interferometric image of a semiconductor wafer 100 from a collimator 104, 122 to one or more optical elements including a camera 118, 136. Folding mirrors 106, 108, 110, 124, 126, 128 allow an interferometric image of a semiconductor wafer 100 to be redirected so that the measuring tool may be made more compact and stable.

A first or large folding mirror 106, 124 may reflect an interferometric image from a collimator 104, 122 along a path substantially perpendicular to the path of the interferometric image when it exits the collimator 104, 122. A second or mid-folding mirror 108, 126 may reflect the interferometric image from the large folding mirror 106, 124 along a path substantially perpendicular to both the path of the interferometric image when it exits the collimator 104, 122 and the path of the interferometric image when it is reflected by the large folding mirror 106, 124. A third or small folding mirror 110, 128 may reflect the interferometric image from the mid-folding mirror 108, 126 along a path substantially parallel to the path of the interferometric image when it is reflected by the large folding mirror 106, 124. In this configuration, an interferometric image of a semiconductor wafer 100 may be extended over a necessary distance defined by the parameters of the optics used to transmit the interferometric image and the size of the semiconductor wafer 100.

The small folding mirror 110, 128 may reflect the interferometric image from the mid-folding mirror 108, 126 to a series of optics. The series of optics may include a λ/4 plate 112, 130, a polarized beam splitter 114, 132, a relay lens 116, 134 and a camera 118, 136. The λ/4 plate 112, 130 is an optical device that alters the polarization state of the beam from circularly polarized to linearly polarized so that the beam passes through the polarized beam splitter 114, 132 with minimum loss. The relay lens 116, 134 may be either a lens or group of lenses that re-constructs the interferometric image at the camera 118, 136.

The polarized beam splitter 114, 132 is also the point at which an illumination source (not shown) is introduced. Light from an illumination source may enter the polarized beam splitter 114, 132 from one side, become linearly polarized after reflected by the polarized beam splitter, and then pass through the λ/4 plate 112, 130 where the light may become circularly polarized. The light may then reflect off each of the folding mirrors 106, 108, 110, 124, 126, 128 to enter the collimator 104, 122 and reference flat 102, 120. The light may then illuminate the semiconductor wafer 100. An interference pattern may be formed between the reference flat 102, 120 and the semiconductor wafer 100. The interference pattern is the image delivered to the camera 118, 136.

Semiconductor inspection facilities may be configured to accommodate a measuring tool designed for 300 mm semiconductor wafers. A 450 mm semiconductor wafer may require a measuring tool with corresponding larger optics. For example, a measuring tool suitable for a 450 mm semiconductor wafer may include one or two reference flats 102, 120 fifty percent larger than reference flats 102, 120 suitable for a measuring tool designed to accommodate a 300 mm semiconductor wafer 100 (a 450 mm semiconductor wafer 100 being fifty percent larger than a 300 mm semiconductor wafer 100). The size of the semiconductor wafer 100 being inspected may dictate the distance that the light from an illumination source needs to travel in order to expand and illuminate the entire semiconductor wafer 100. Likewise, the same distance may be necessary to focus the interferometric image.

In a measuring tool according to FIG. 1, all of the dimensions of the measuring tool may need to be extended to accommodate a 450 mm semiconductor wafer. Such dimensions may increase the size of the measuring tool beyond the space available in existing 300 mm semiconductor processing facilities. Furthermore, optics such as mirrors may be prone to vibration and gravitational distortion. Increasing the size of certain optical components may make such optical components more prone to these effects.

Figure 2:
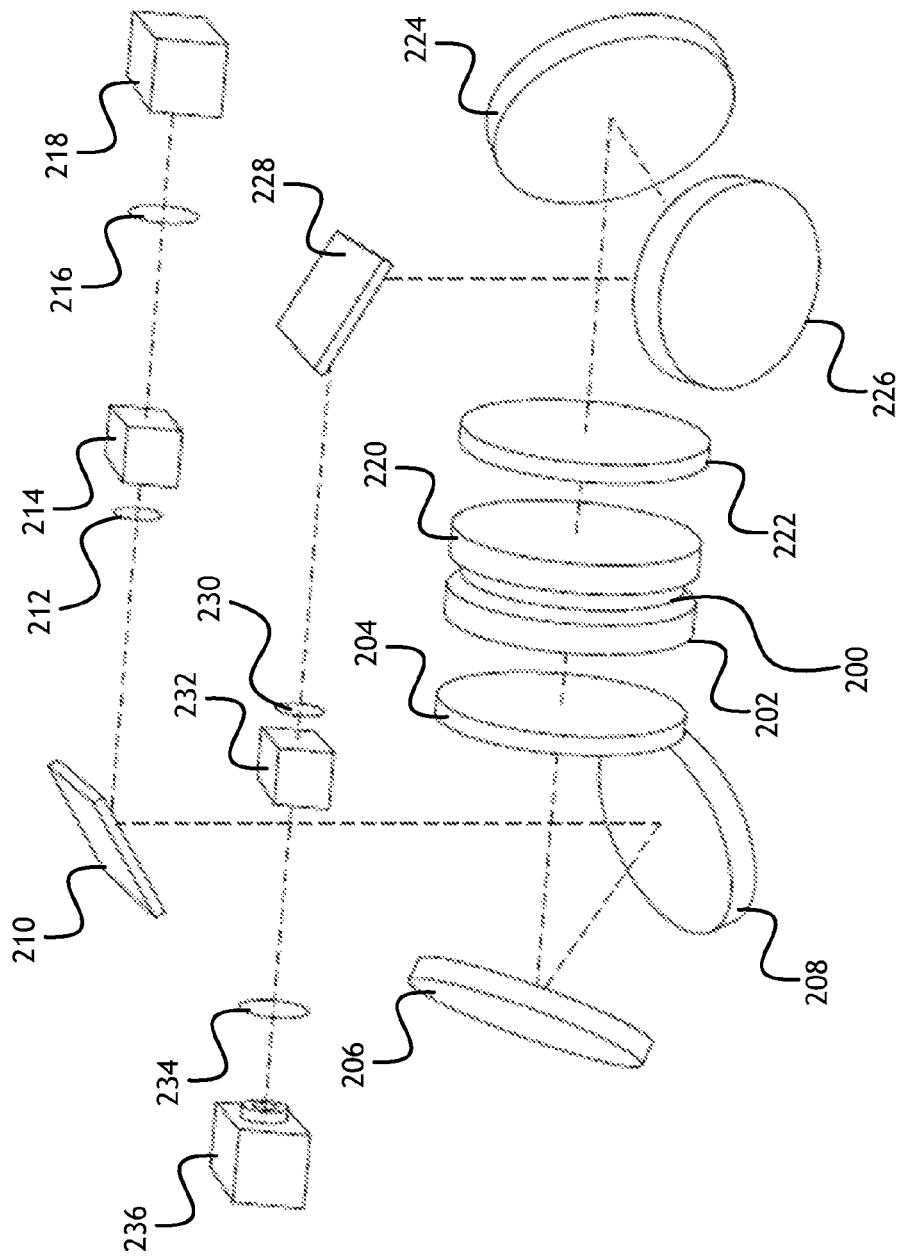
FIG. 2 shows a perspective view of a measuring tool according to the present invention.

Referring to FIG. 2, a perspective view of a measuring tool according to the present invention is shown. The measuring tool may include one or two reference flats 202, 220 and one or two collimators 204, 222. The measuring tool may also include one or more series of folding mirrors 206, 208, 210, 224, 226, 228.

Each series of folding mirrors 206, 208, 210, 224, 226, 228 may reflect an interferometric image of a semiconductor wafer 200 from a collimator 204, 222 to one or more optical elements including a camera 218, 236. Folding mirrors 206, 208, 210, 224, 226, 228 allow an interferometric image of a semiconductor wafer 200 to be redirected so that the measuring tool may be made more compact and stable.

A first or large folding mirror 206, 224 may reflect an interferometric image from a collimator 204, 222 along a path toward a second or mid-folding mirror 208, 226. The large folding mirror 206, 224 may be oriented with respect to an axis normal to the reference flats 202, 220 such that the angle of incidence of light exiting the collimator 204, 222 may be less than 45°; an angle of incidence less than 45° may allow the large folding mirror 206, 224 to comprise a smaller, lighter mirror as compared to the prior art. The mid-folding mirror 208, 226 may reflect the interferometric image from the large folding mirror 206, 224 toward a third or small folding mirror 210, 228. The mid-folding mirror 208, 226 may be positioned relative to the large folding mirror 206, 224 so as to redirect the light to travel between the large mirror and the collimator 204, 222.

The small folding mirror 210, 228 may reflect the interferometric image from the mid-folding mirror 208, 226 along a path substantially parallel to the path of the interferometric image when it exited the collimator 204, 222. In this configuration, a dimension of the measuring tool corresponding to an axis normal to a semiconductor wafer 200 being measured may define a distance that may be utilized multiple times to focus the interferometric image. Elongated the measuring tool along that dimension may increase the distance traveled by the interferometric image by some multiple of the actual elongation, and thereby reduce the scaling factor when processing 450 mm semiconductor wafers 200 as compared to 300 mm semiconductor wafers 200. Furthermore, the compact nature of the measuring tool may reduce the potential for vibrational distortion.

The small folding mirror 210, 228 may reflect the interferometric image from the mid-folding mirror 208, 226 to a series of optics. The series of optics may include a λ/4 plate 212, 230, a polarized beam splitter 214, 232, a relay lens 216, 234 and a camera 218, 236. The λ/4 plate 212, 230 is an optical device that alters the polarization state of the beam from circularly polarized to linearly polarized so that the beam passes the polarized beam splitter 214, 232 with minimum loss. The relay lens 216, 234 may be either a lens or group of lenses that re-constructs the interferometric image at camera 218, 236.

The polarized beam splitter 214, 232 is also the point at which an illumination source (not shown) is introduced. Light from an illumination source may enter the polarized beam splitter 214, 232 from its side, be reflected by it towards λ/4 plate 212, 230. At this point, it becomes linearly polarized. After passing through the λ/4 plate 212, 230, the light may become circularly polarized. The light may then reflect off of each of the folding mirrors 206, 208, 210, 224, 226, 228 to enter the collimator 204, 222 and reference flat 202, 220. The circularly polarized light may then illuminate the semiconductor wafer 200. An interference pattern may be formed between the reference flat 202, 220 and the semiconductor wafer 200. The interference pattern is the image to be delivered to the camera 218, 236.

Semiconductor inspection facilities may be configured to accommodate a measuring tool designed for 300 mm semiconductor wafers. One potential advantage of the present invention is the ability to operate a measuring tool for 450 mm semiconductor wafers in a facility designed for 300 mm semiconductor wafers. A 450 mm semiconductor wafer may require a measuring tool with correspondingly larger optics. A measuring tool suitable for a 450 mm semiconductor wafer may include one or two reference flats 202, 220 fifty percent larger than reference flats 202, 220 suitable for a measuring tool designed to accommodate a 300 mm semiconductor wafer 200 (a 450 mm semiconductor wafer 200 being fifty percent larger than a 300 mm semiconductor wafer 200). The size of the semiconductor wafer 200 being inspected may dictate the distance light from an illumination source needs to travel in order to expand and illuminate the entire semiconductor wafer 200. Likewise, the same distance may be necessary to focus the interferometric image. A measuring tool with folding mirrors according to the present invention 206, 208, 210, 224, 226, 228 may conform to size restrictions imposed by a facility designed for 300 mm semiconductor wafers 200 even when the measuring tool is configured to inspect 450 mm semiconductor wafers 200. One skilled in the art may appreciate that the concepts set forth herein are equally applicable to semiconductor wafer measuring tools of all sizes, and that the example of 450 mm semiconductor wafers is exemplary and should not be considered a limitation.

Figure 3:
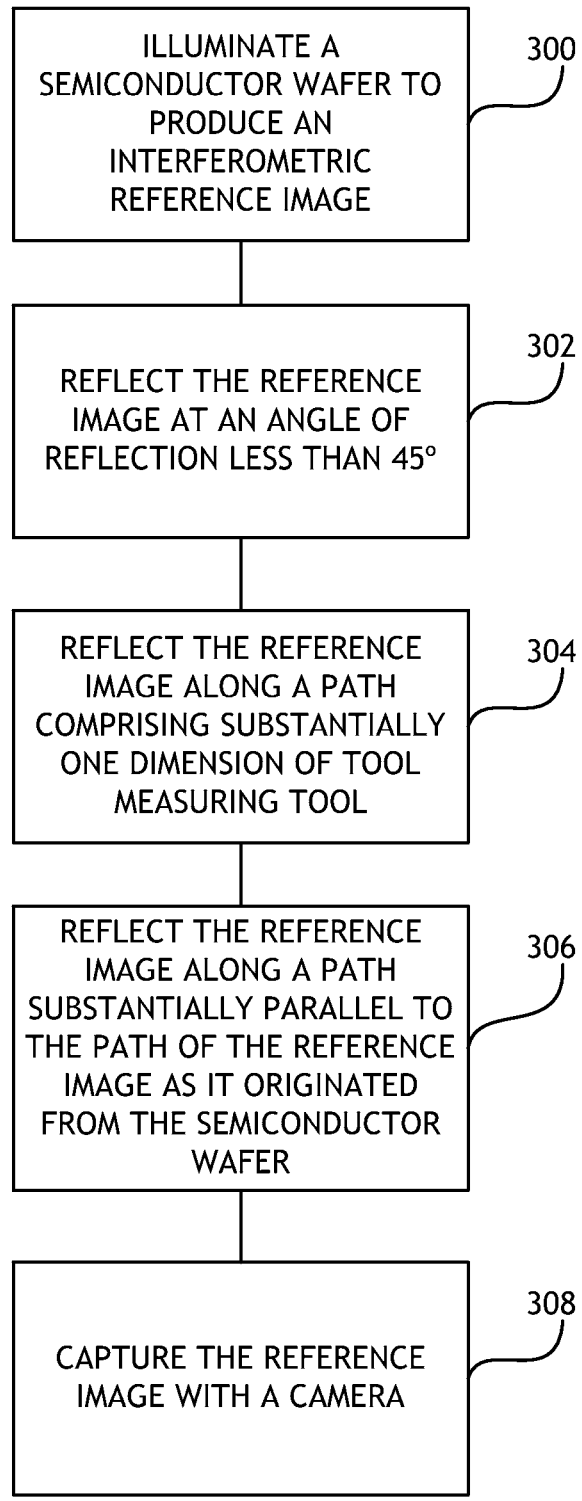
FIG. 3 shows a flowchart of a method for measuring a semiconductor wafer.

Referring to FIG. 3, a flowchart of a method for measuring a semiconductor wafer is shown. The method may include illuminating 300 a semiconductor wafer with an illuminator. The light may pass through a reference flat prior to illuminating the semiconductor wafer to produce an interference pattern. The interferometric image may provide important measurement information about the semiconductor wafer. The image may need to travel a certain distance to be reduced in size to be captured by a camera. Such distance, if applied in any one direction, may be impractical for a measuring tool in a semiconductor production facility. The distance may be distributed along various dimensions within the measuring tool.

The interferometric image may travel along a path substantially normal to the surface of the semiconductor wafer, and may then be reflected 302 by a large folding mirror. The interferometric image may be reflected 302 by the large folding mirror so as to direct the interferometric image along one or more first alternative dimensions of the measuring tool; furthermore, the interferometric image may be reflected 302 by the large folding mirror at an angle less than 45°.

The interferometric image may be reflected 304 by a mid-folding mirror along a path defined by one or more second alternative dimensions of the measuring tool. The interferometric image may then be reflected 306 by a small folding mirror along a path substantially parallel to a path defined by a line normal to the surface of the semiconductor wafer. The interferometric image may then be captured 308 by a camera suitable for capturing an interferometric image of a semiconductor wafer.

By this method, any increase in the length of the measuring tool along an axis corresponding to a line normal to the surface of a semiconductor wafer may be reflected multiple times in distance traveled by the interferometric image. Furthermore, a measuring tool such as the one shown in FIG. 2 may measure both sides of a semiconductor wafer simultaneously. In that case, optics dedicated to each side of the semiconductor wafer may be configured to utilize different areas of the measuring tool so as to achieve the necessary distance traveled by each interferometric image. Two separate interferometric image paths may utilize one dimension of the measuring tool multiple times such that any increase in the length of the measuring tool along an axis corresponding to that dimension may be reflected multiple times in distance traveled by each interferometric image. The interferometric image may thereby pass the same space, for example the space between the collimator and the large mirror, multiple times, reducing the size of the measuring tool overall and placing components of the measuring tool in proximity to increase stability.

These systems and methods may allow for measuring tools capable of measuring larger semiconductor wafers that prior art measuring tools cannot. They may also allow for the use of smaller optics and improved stability.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for directing an interferometric image in a semiconductor wafer measuring tool, comprising:
   a first folding mirror configured to reflect an interferometric image from a semiconductor wafer in a first direction;
   a second folding mirror configured to receive an interferometric image from the first folding mirror, and reflect the interferometric image in a second direction; and
   a third folding mirror configured to receive an interferometric image from the second folding mirror, and reflect the interferometric image in a third direction,
   wherein the third direction is parallel to a direction of travel of the interferometric image from the semiconductor wafer such that the third fold mirror is configured to reflect an interferometric image to repass the space between the semiconductor wafer and the first folding mirror, such that an increase in a distance between the semiconductor wafer and the first folding mirror produces a corresponding increase in the actual distance traveled by the interferometric image that is twice the increase in distance between the semiconductor wafer and the first folding mirror.

2. The system of claim 1, wherein the first folding mirror is configured to reflect an interferometric image of a semiconductor wafer larger than 400 mm.

3. The system of claim 1, wherein the first folding mirror is configured to reflect an interferometric image at an angle of reflection less than 45°.

4. The system of claim 1, further comprising:
   a fourth folding mirror configured to reflect an interferometric image from a semiconductor wafer in a fourth direction;
   a fifth folding mirror configured to receive an interferometric image from the fourth folding mirror, and reflect the interferometric image in a fifth direction substantially parallel to the second direction; and
   a sixth folding mirror configured to receive an interferometric image from the fifth folding mirror, and reflect the interferometric image in a sixth direction substantially parallel to the third direction,
   wherein:
      the sixth folding mirror is configured to reflect an interferometric image along a path substantially parallel to a path of an interferometric image originating from a semiconductor wafer, such that an increase in a distance between the semiconductor wafer and the fourth folding mirror produces a corresponding increase in the actual distance traveled by the interferometric image that is twice the increase in distance between the semiconductor wafer and the fourth folding mirror.

5. The system of claim 4, wherein the first folding mirror is configured to reflect an interferometric image of a first surface of a semiconductor wafer; and the fourth folding mirror is configured to reflect an interferometric image of a second surface of the semiconductor wafer.

6. The system of claim 1, wherein the third folding mirror is configured to reflect an interferometric image along a path substantially parallel to a path of an interferometric image originating from a semiconductor wafer.

7. An interferometric measuring tool for measuring the shape and thickness of a semiconductor wafer, comprising:
   a first folding mirror configured to reflect an interferometric image from a semiconductor wafer in a first direction;
   a second folding mirror configured to receive an interferometric image from the first folding mirror, and reflect the interferometric image in a second direction; and
   a third folding mirror configured to receive an interferometric image from the second folding mirror, and reflect the interferometric image in a third direction,
   wherein the third direction is parallel to a direction of travel of the interferometric image from the semiconductor wafer such that the third folding mirror is configured to reflect an interferometric image to repass the space between the semiconductor wafer and the first folding mirror, such that an increase in a distance between the semiconductor wafer and the first folding mirror produces a corresponding increase in the actual distance traveled by the interferometric image that is twice the increase in distance between the semiconductor wafer and the first folding mirror.

8. The measuring tool of claim 7, wherein the first folding mirror is configured to reflect an interferometric image of a semiconductor wafer larger than 400 mm.

9. The measuring tool of claim 7, wherein the first folding mirror is configured to reflect an interferometric image at an angle of reflection less than 45°.

10. The measuring tool of claim 7, further comprising:
   at least one reference flat configured to produce an interference image in conjunction with a semiconductor wafer when the semiconductor wafer is illuminated by an illuminator; and
   at least one collimator lens configured to reduce the size of an interferometric image produced by the reference flat and a semiconductor wafer,
   wherein the reference flat and collimator are interposed between an area configured to hold a semiconductor wafer for inspection and the first folding mirror.

11. The measuring tool of claim 7, further comprising at least one optical assembly comprising:
   a beam splitter configured to:
      allow an illuminator to introduce light to the wave plate; and
      receive an interferometric image;
   an optical relay configured to receive an interferometric image from the beam splitter; and
   a camera configured to capture an interferometric image from the optical relay.

12. The measuring tool of claim 7, further comprising:
   a fourth folding mirror configured to reflect an interferometric image from a semiconductor wafer in a fourth direction;
   a fifth folding mirror configured to receive an interferometric image from the fourth folding mirror, and reflect the interferometric image in a fifth direction substantially parallel to the second direction; and
   a sixth folding mirror configured to receive an interferometric image from the fifth folding mirror, and reflect the interferometric image in a sixth direction substantially parallel to the third direction,
   wherein:
      the sixth folding mirror is configured to reflect an interferometric image along a path substantially parallel to a path of an interferometric image originating from a semiconductor wafer such that an increase in a distance between the semiconductor wafer and the fourth folding mirror produces an increase in focal length that is twice the increase in a distance between the semiconductor wafer and the fourth folding mirror.

13. The measuring tool of claim 12, wherein the first folding mirror is configured to reflect an interferometric image of a first surface of a semiconductor wafer; and the fourth folding mirror is configured to reflect an interferometric image of a second surface of the semiconductor wafer.

14. The measuring tool of claim 7, wherein the third folding mirror is configured to reflect an interferometric image along a path substantially parallel to a path of an interferometric image originating from a semiconductor wafer.

15. A method for directing an interferometric image in a semiconductor measuring tool, comprising:
   reflecting the interferometric image with a first folding mirror from a semiconductor wafer, in a first direction, to a second folding mirror;
   reflecting the interferometric image with the second folding mirror, in a second direction, to a third folding mirror; and
   reflecting the interferometric image with the third folding mirror, in a third direction parallel to the first direction, to an optical assembly,
wherein the third folding mirror is configured to reflect an interferometric image through the space between the semiconductor wafer and the first folding mirror, along an axis parallel to an axis defined by the first folding mirror and semiconductor wafer, such that an increase in a distance between the semiconductor wafer and the first folding mirror produces an increase in the actual distance traveled by the interferometric image that is twice the increase in distance between the semiconductor wafer and the first folding mirror.

16. The method of claim 15, further comprises capturing the interferometric image with a camera wherein the optical assembly comprises the camera.

17. The method of claim 15, wherein the first folding mirror is configured to reflect an interferometric image at an angle of reflection less than 45°.

18. The method of claim 15, further comprising illuminating the semiconductor wafer with an illumination source.

19. The method of claim 15, wherein the first folding mirror is configured to reflect an interferometric image of a semiconductor wafer larger than 400 mm.

20. The method of claim 15, wherein the third folding mirror reflects the interferometric image along a path substantially parallel to the path of the interferometric image from the semiconductor wafer.

* * * * *